(12) United States Patent
McClelland

(10) Patent No.: US 9,418,696 B2
(45) Date of Patent: Aug. 16, 2016

(54) FAST-ACCESS SELF-REPAIRING TAPE LIBRARY USING MOBILE ROBOTS

(71) Applicant: International Business Machines Corporation, Armonk, NY (US)

(72) Inventor: Gary M. McClelland, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/476,618

(22) Filed: Sep. 3, 2014

(65) Prior Publication Data

US 2014/0371902 A1  Dec. 18, 2014

Related U.S. Application Data

(63) Continuation of application No. 13/888,287, filed on May 6, 2013, now Pat. No. 8,862,265, which is a continuation of application No. 13/558,232, filed on Jul. 25, 2012, now Pat. No. 8,509,946, which is a continuation of application No. 13/217,181, filed on Aug. 24, 2011, now Pat. No. 8,494,674.

(51) Int. Cl.
*G06F 7/00* (2006.01)
*G11B 15/68* (2006.01)
*G11B 15/66* (2006.01)
(Continued)

(52) U.S. Cl.
CPC .......... *G11B 15/6895* (2013.01); *B65G 1/1371* (2013.01); *G11B 15/66* (2013.01); *G11B 15/674* (2013.01); *G11B 15/6835* (2013.01); *Y10S 901/01* (2013.01)

(58) Field of Classification Search
CPC ..................................................... H01L 21/681
USPC .......................................................... 700/218
See application file for complete search history.

(56) References Cited

U.S. PATENT DOCUMENTS

| | | | |
|---|---|---|---|
| 3,715,040 A | 2/1973 | Polus | |
| 4,432,508 A * | 2/1984 | Inoue | G11B 15/67 226/92 |
| 4,864,511 A | 9/1989 | Moy et al. | |

(Continued)

FOREIGN PATENT DOCUMENTS

| | | |
|---|---|---|
| EP | 0558252 | 1/1993 |
| JP | S5933660 A | 2/1984 |

(Continued)

OTHER PUBLICATIONS

Hanaoka et al., "Technologies for Realizing New Eternus LT270 High-End Tape Library System," FUJITSU Sci. Tech. J., vol. 42, No. 1, Jan. 2006, pp. 24-31.

(Continued)

*Primary Examiner* — Kyle Logan
(74) *Attorney, Agent, or Firm* — Zilka-Kotab, PC

(57) ABSTRACT

Various methods for threading a tape on the one or more reels onto the tape drive. A method according to one embodiment uses a mobile robot to thread a tape on the one or more reels onto the tape drive. A method according to another embodiment includes threading a tape across a tape drive by moving at least one of a tape reel and a take up reel coupled to the tape. A method according to yet another embodiment includes threading the tape across a tape drive using at least one of rollers and cylinders.

18 Claims, 10 Drawing Sheets

(51) Int. Cl.
*B65G 1/137* (2006.01)
*G11B 15/67* (2006.01)

(56) References Cited

U.S. PATENT DOCUMENTS

| | | | |
|---|---|---|---|
| 4,928,245 A | 5/1990 | Moy et al. | |
| 4,932,826 A | 6/1990 | Moy et al. | |
| 4,989,191 A | 1/1991 | Kuo | |
| 5,081,548 A | 1/1992 | Inazawa et al. | |
| 5,150,452 A * | 9/1992 | Pollack et al. | 700/255 |
| 5,155,639 A * | 10/1992 | Platter | G11B 15/607 242/332.4 |
| 5,214,768 A | 5/1993 | Martin et al. | |
| 5,333,810 A * | 8/1994 | Hoge | G11B 15/67 242/332.4 |
| 5,367,410 A | 11/1994 | McCarthy | |
| 5,395,199 A | 3/1995 | Day, III et al. | |
| 5,412,791 A | 5/1995 | Martin et al. | |
| 5,504,873 A | 4/1996 | Martin et al. | |
| 5,557,770 A | 9/1996 | Bhide et al. | |
| 5,906,324 A * | 5/1999 | Adams | G03B 1/58 242/332.8 |
| 5,956,301 A | 9/1999 | Dimitri et al. | |
| 6,198,593 B1 | 3/2001 | Hori et al. | |
| 6,260,006 B1 | 7/2001 | Wong et al. | |
| 6,421,579 B1 | 7/2002 | Dimitri et al. | |
| 6,438,459 B1 | 8/2002 | Dimitri et al. | |
| 6,718,228 B2 | 4/2004 | Campbell et al. | |
| 6,808,353 B2 | 10/2004 | Ostwald et al. | |
| 6,856,985 B1 * | 2/2005 | Pierce et al. | |
| 6,868,049 B2 | 3/2005 | Ostwald et al. | |
| 7,039,657 B1 | 5/2006 | Bish et al. | |
| 7,546,180 B1 * | 6/2009 | Ries et al. | 700/248 |
| 8,019,455 B2 * | 9/2011 | Maenishi et al. | 700/99 |
| 8,065,033 B2 * | 11/2011 | Hoshino | 700/218 |
| 8,108,065 B2 * | 1/2012 | Greco et al. | 700/214 |
| 8,159,776 B2 | 4/2012 | Fujita et al. | |
| 8,198,593 B2 | 6/2012 | Kito et al. | |
| 8,244,403 B2 * | 8/2012 | Lin et al. | 700/253 |
| 8,494,674 B2 | 7/2013 | McClelland | |
| 8,509,946 B2 | 8/2013 | McClelland | |
| 8,666,535 B2 | 3/2014 | McClelland | |
| 8,862,265 B2 * | 10/2014 | McClelland | 700/218 |
| 9,263,082 B2 | 2/2016 | Hetzler et al. | |
| 2002/0062167 A1 * | 5/2002 | Dimitri et al. | 700/214 |
| 2002/0087783 A1 | 7/2002 | Leonhardt et al. | |
| 2003/0016465 A1 * | 1/2003 | Bui | G11B 5/584 360/72.3 |
| 2003/0063966 A1 | 4/2003 | Apple et al. | |
| 2004/0149850 A1 * | 8/2004 | Nejezchleb | G11B 23/107 242/348 |
| 2005/0256999 A1 | 11/2005 | Kishi et al. | |
| 2007/0266203 A1 | 11/2007 | Amano et al. | |
| 2008/0201012 A1 | 8/2008 | Hoshino | |
| 2009/0177314 A1 * | 7/2009 | Greco et al. | 700/218 |
| 2010/0030378 A1 | 2/2010 | Choi et al. | |
| 2010/0042247 A1 | 2/2010 | Starr et al. | |
| 2011/0122527 A1 | 5/2011 | Amir et al. | |
| 2011/0213493 A1 * | 9/2011 | Stutz | 700/218 |
| 2011/0292531 A1 | 12/2011 | Sato | |
| 2012/0110257 A1 | 5/2012 | Enohara et al. | |
| 2012/0148379 A1 | 6/2012 | Green et al. | |
| 2012/0287532 A1 | 11/2012 | Acevedo et al. | |
| 2013/0054006 A1 | 2/2013 | McClelland | |
| 2013/0054007 A1 | 2/2013 | McClelland | |
| 2013/0226333 A1 | 8/2013 | McClelland | |
| 2013/0245813 A1 | 9/2013 | McClelland | |
| 2014/0211602 A1 | 7/2014 | Hetzler | |
| 2016/0005432 A1 | 1/2016 | Hetzler et al. | |

FOREIGN PATENT DOCUMENTS

| | | |
|---|---|---|
| JP | H04302846 A | 10/1992 |
| JP | 0684251 | 3/1994 |
| JP | 2002373464 A | 12/2002 |
| JP | 2004-086251 | 3/2004 |
| WO | 0041093 A2 | 7/2000 |

OTHER PUBLICATIONS

"Classification Definitions," Dec. 2000, pp. 901/1-901/18.
Johnson, C., "IBM 3850—Mass storage system," AFIPS '75 Proceedings of the May 19-22, 1975, national computer conference and exposition, pp. 509-514.
Dean et al., "Multi-Arm Journaling," IBM TDB, IPCOM000119590D, Feb. 1, 1991, vol. 33, No. 9, pp. 107-111.
"Systems: Introduction to the IBM 3850 Mass Storage System (MSS)," IBM, Third Edition, Jul. 1975, pp. 1-92.
"IBM 3850," Wikipedia, the free encyclopedia, http://en.wikipedia.org/wiki/IBM_3850, last modified Oct. 31, 2012, downloaded Jan. 29, 2013.
Non-Final Office Action from U.S. Appl. No. 13/217,181 dated Oct. 5, 2012.
Notice of Allowance and Fee(s) Due from U.S. Appl. No. 13/217,181 dated Mar. 26, 2013.
Non-Final Office Action from U.S. Appl. No. 13/558,232 dated Oct. 3, 2012.
Notice of Allowance and Fee(s) Due from U.S. Appl. No. 13/558,232 dated Apr. 8, 2013.
U.S. Appl. No. 13/859,668, filed Apr. 9, 2013.
Non-Final Office Action from U.S. Appl. No. 13/859,668 dated Jun. 20, 2013.
Notice of Allowance and Fee(s) Due from U.S. Appl. No. 13/859,668 dated Oct. 16, 2013.
U.S. Appl. No. 13/888,287, filed on May 6, 2013.
Non-Final Office Action from U.S. Appl. No. 13/888,287 dated Aug. 19, 2013.
Final Office Action from U.S. Appl. No. 13/888,287 dated Mar. 3, 2014
Notice of Allowance and Fee(s) Due from U.S. Appl. No. 13/888,287 dated Jun. 6, 2014.
U.S. Appl. No. 13/754,714, filed Jan. 30, 2013.
U.S. Appl. No. 13/217,181, filed Aug. 24, 2011.
U.S. Appl. No. 13/558,232, filed, Jul. 25, 2012.
International Search Report and Written Opinion from PCT Application No. PCT/IB2014/058593 dated May 13, 2014.
Notice of Allowance from U.S. Appl. No. 13/754,714, dated Sep. 16, 2015.
Non-Final Office Action from U.S. Appl. No. 13/754,714, dated Nov. 7, 2014.
Final Office Action from U.S. Appl. No. 13/754,714, dated Mar. 12, 2015.
Non-Final Office Action from U.S. Appl. No. 13/754,714, dated Mar. 23, 2015.
Final Office Action from U.S. Appl. No. 13/754,714, dated Jul. 16, 2015.
Hetzler et al., U.S. Appl. No. 14/855,294, filed Sep. 15, 2015.

* cited by examiner

FAST-ACCESS SELF-REPAIRING TAPE LIBRARY USING MOBILE ROBOTS

RELATED APPLICATIONS

This application is a continuation of copending U.S. patent application Ser. No. 13/888,287 filed May 6, 2013, which is a continuation of U.S. patent application Ser. No. 13/558,232 filed Jul. 25, 2012, which is a continuation of U.S. patent application Ser. No. 13/217,181, filed Aug. 24, 2011, from all of which priority is claimed and which are all herein incorporated by reference.

BACKGROUND

The present invention relates to data storage systems, and more particularly, to mobile robots for use in tape libraries.

In magnetic storage systems, data are read from, and written onto, a magnetic recording medium utilizing magnetic transducers. Data are written on the magnetic recording medium by moving a magnetic recording transducer to a position over the medium where the data are to be stored. The magnetic recording transducer then generates a magnetic field, which encodes the data into the magnetic medium. Data are read from the medium by similarly positioning the magnetic read transducer and then sensing the magnetic field of the magnetic medium. Read and write operations may be independently synchronized with the movement of the medium to ensure that the data can be read from, and written to, the desired location on the medium.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions. Also when the read element is in near contact with the tape, effective coupling of the magnetic field from the tape to the read element is possible.

In the near future, with the adoption of improved media, the cost of storing information (on a per byte basis) on tape is expected to decline by a factor of five or more with respect to magnetic disk. Also, short-term and long-term reliability will continue to favor tape-based storage. Furthermore, as more mass storage is allocated to cloud networks, most storage will be in large libraries, rather than on individual drives, which is a consideration favoring tape-based storage. One disadvantage of tape-based storage with respect to disk-based storage is the relatively poor access time associated with tape-based storage, with the time required to bring the tape to the tape drive and then spool the tape to the file location typically averaging about 40 seconds. If the access time could be reduced, tape-based storage would be better positioned versus disk-based storage for storing files around 10 MB and greater, such as photographs, videos, collections, etc., which are accessed only rarely, but which users want to be able to retrieve almost immediately, e.g., within about a second.

BRIEF SUMMARY

A method according to one embodiment includes causing, using a controller, a mobile robot having a volume of less than about 1000 cubic inches to selectively retrieve one or more of a plurality of tape reels, and causing the mobile robot to transport the one or more retrieved tape reels to a tape drive that is configured for reading data from tape stored on at least one of the plurality of tape reels. The mobile robot threads a tape on the one or more reels onto the tape drive.

A method according to another embodiment includes causing, using a controller, a mobile robot to selectively retrieve at least one of a plurality of tape reels, causing the mobile robot to transport the at least one retrieved tape reel to a reel chuck, and threading a tape on the at least one retrieved tape reel across a tape drive by moving at least one of the tape reel and a take up reel coupled to the tape.

A method according to yet another embodiment includes causing, using a controller, a mobile robot to selectively retrieve a pair of tape reels coupled to a tape, causing the mobile robot to transport the at least tape reels to a pair of reel chucks, and threading the tape across a tape drive using at least one of rollers and cylinders.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a system includes a plurality of tape reels, a tape drive configured for reading data from tape stored on at least one of the plurality of tape reels, a mobile robot having a volume of less than about 1000 cubic inches, the robot configured for selectively retrieving one or more of the plurality of tape reels and transporting the one or more retrieved tape reels to the tape drive, wherein the robot moves unconstrained along a first surface, and a controller for directing movement of the robot.

In another general embodiment, a system includes a plurality of tape reels positioned on a lower surface, a tape drive for reading data from a tape on one of the plurality of tape reels, at least one mobile robot configured for selectively retrieving at least one of the plurality of tape reels and transporting the at least one retrieved tape reel to the tape drive, wherein the at least one mobile robot moves unconstrained along an upper surface that overlies the plurality of tape reels, and a controller for directing movement of the at least one mobile robot.

Figure 1:
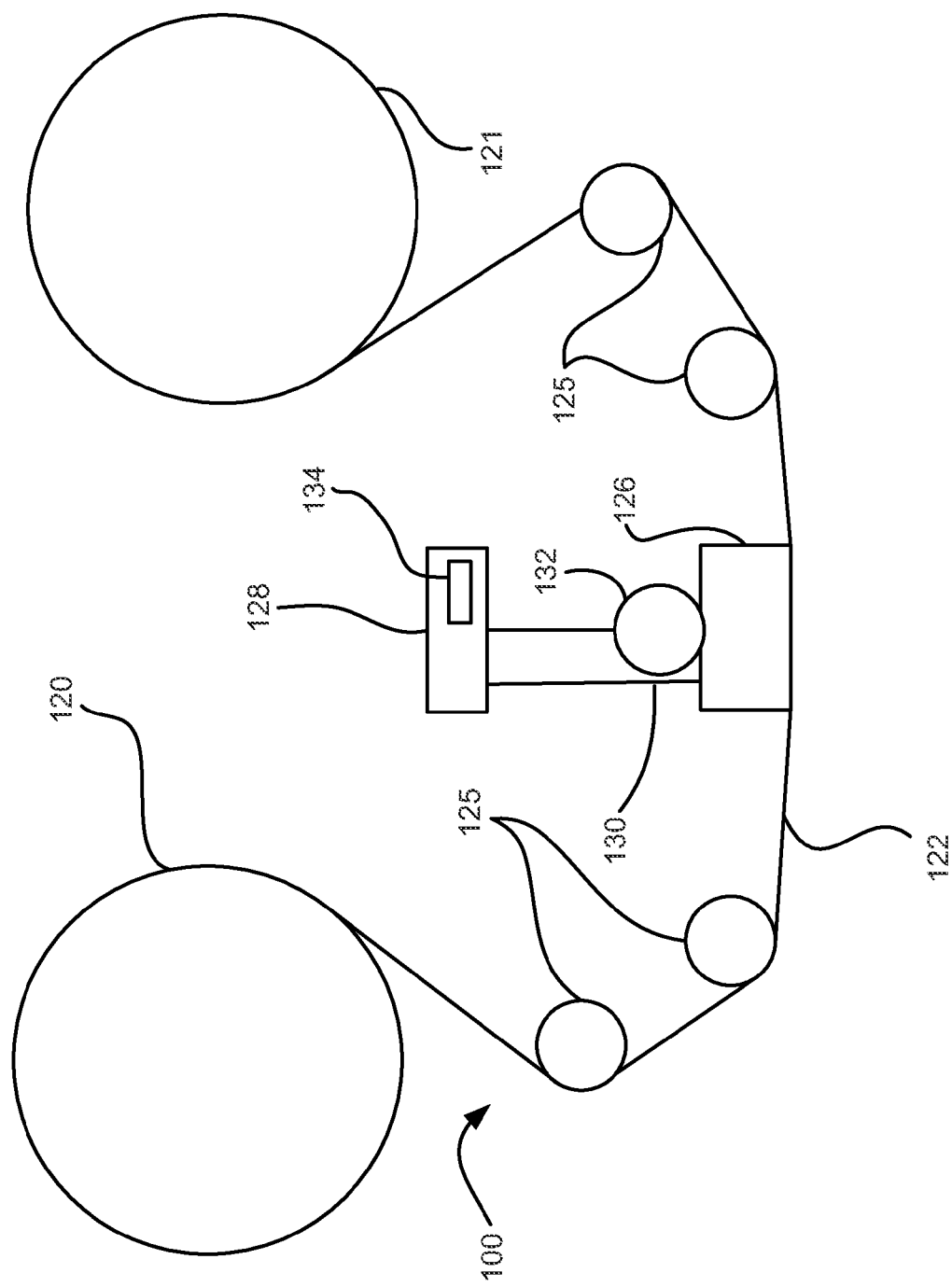
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of a variety of tape drive systems.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller assembly 128 via a cable 130. The controller 128 typically controls head functions such as servo following, writing, reading, etc. The controller may operate under logic known in the art, as well as any logic disclosed herein. The cable 130 may include read/write circuits to transmit data to the head 126 to be recorded on the tape 122 and to receive data read by the head 126 from the tape 122. An actuator 132 controls the position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
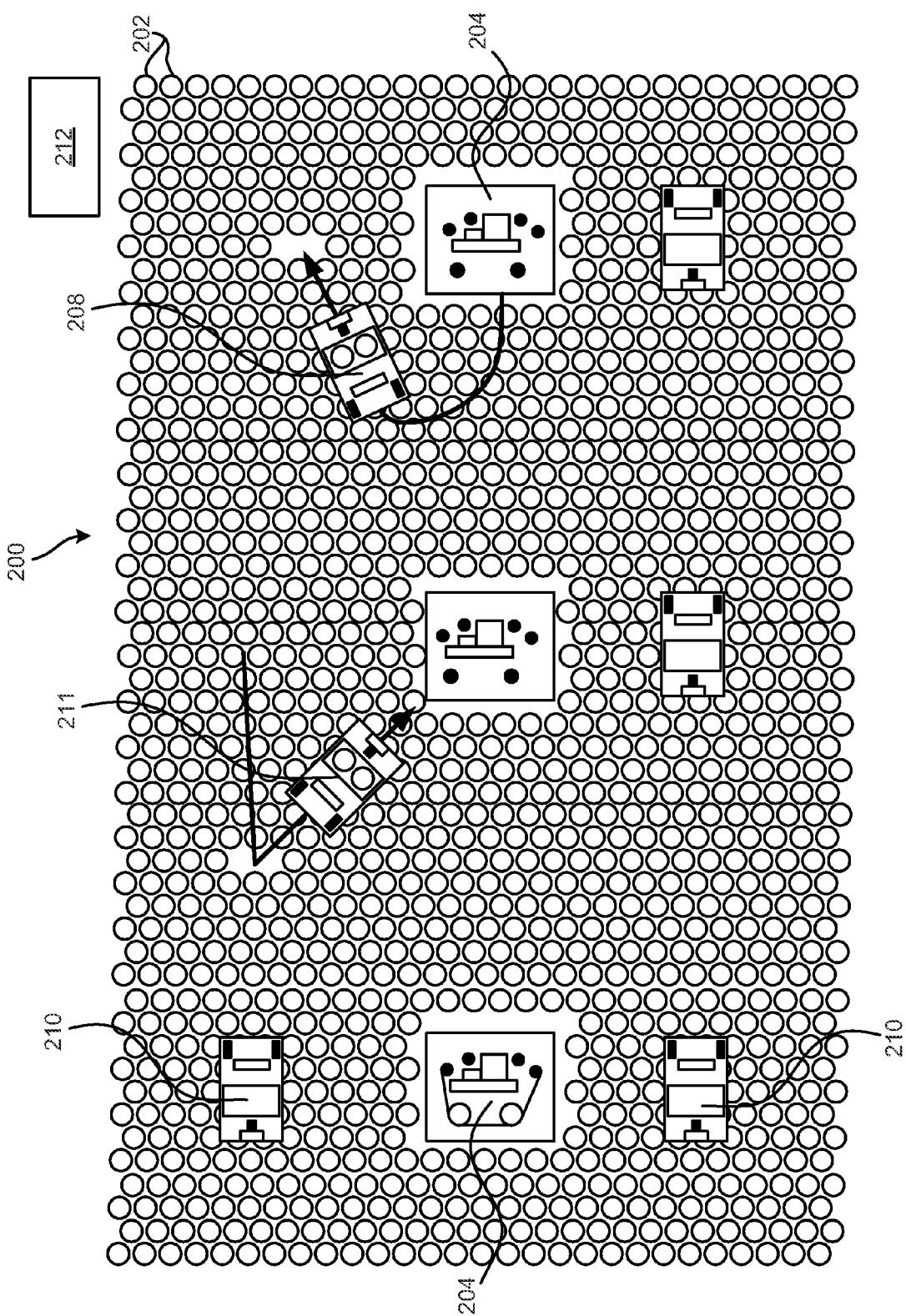
FIG. 2 illustrates a system using mobile robots for faster access to tape, according to one embodiment.
Figure 3:
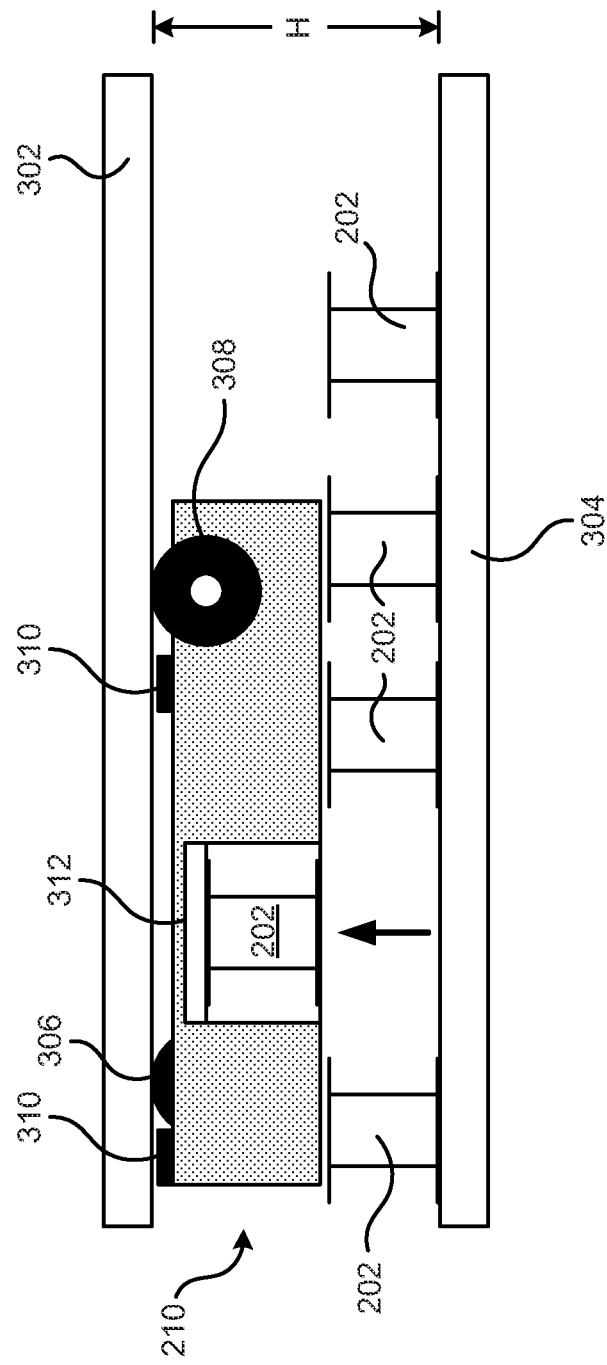
FIG. 3 shows a more detailed view of a mobile robot, according to one embodiment.

As shown by the partial top down view of FIG. 2 and the cross-sectional view of FIG. 3, a system 200, such as a tape library, may include one or more mobile robots 210 for transporting at least one tape reel 202, which may or may not be part of a tape cartridge, to and from tape drives 204 for reading data from the tape. The tape on the selected tape reel or pair of tape reels may be accessed by the mobile robots 210, which may be miniature remote-controlled vehicles that move on a surface (such as an upper surface 302, used interchangeably with the term "ceiling," as shown in FIG. 3). Thus, the tape reels may lie on a lower surface, such as a "floor," while a mobile robot maneuvers on the upper surface unconstrained, e.g., without the use of rails, tracks, pathways, etc., such as through magnetic attraction between the robot and the upper surface or portions of the upper surface (see FIG. 3). In one approach, the tape library may comprise more than one level. On each level, tape reels may be arranged on a lower surface (used interchangeably with the term "floor") in a dense pattern. This arrangement is shown in partial top down view of FIG. 2, according to one embodiment.

A contiguous tape may be stored on a single reel, and may include a pin or other end piece that enables threading of the tape in the tape drive. In other approaches, the tape may be coupled to a pair of reels, e.g., in a tape cartridge.

According to one embodiment, magnetic tape may be included in miniature tape reels 202 which have only a fraction of the tape length of a standard tape cartridge, thereby decreasing seek time. Such shorter length may be, e.g., less than about ⅕th the tape length of a standard Linear Tape Open (LTO) tape cartridge, less than about ¹⁄₂₅$^{th}$ the tape length of a standard tape cartridge, less than about ⅕₀th the tape length of a standard tape cartridge, etc. In some approaches, a length of tape on the plurality of tape reels 202 may be less than about 50 meters for each tape reel 202, and may be preferably less than about 25 meters, more preferably 20 meters or less, etc.

The seek time of tape-based systems using such tape reels may also or alternatively be decreased by increasing the locate speed, e.g., to about 20 meters per second (m/s) or faster. "Locate time" refers to the time required for the tape to wind to the beginning of a data set (or file) after the tape is loaded in the tape drive. If the tape length is reduced to about 20 m or less and the locate speed is about 20 m/s, the average locate time is (20 m/20 m/s)/2=0.5 s. In addition to decreasing the seek time in the drive, the system seek time may be reduced by structuring the tape library to achieve a mean load time of about 0.5 s. "Load time" refers to the time between the first time when a request reaches the tape library and a second time when the relevant tape reel(s) are loaded in the tape drive.

According to one embodiment, the tape system is configured such that the average seek time is less than about 2 seconds, preferably about 1 second or less. The seek time is the delay between a first time when a request to access data is received by the tape library, and a second time when the tape library begins to provide the data to the requester.

With continued reference to FIG. 2, the tape reels 202 may be closely packed, for example in a hexagonal array, ordered array, circular arrangement, etc., to maximize the number of tape reels that may be stored in a limited amount of space.

According to one embodiment, a diameter of each of the plurality of tape reels 202 may be less than about 100 mm, such as less than about 50 mm, less than about 40 mm, less than about 30 mm.

In some approaches, a single tape drive 204 is available for reading and/or writing tape on the tape reels 202. Depending on the frequency with which files are read, a plurality of tape drives 204 may be available for reading and/or writing tape on the tape reels 202, as shown in FIG. 2 by the leftmost tape drive 204 reading a tape. The tape drives 204 may be located about the surface in any arrangement as would be known to one of skill in the art, preferably such that quick access to the tape drives 204 is possible to reduce loading and data access times.

In one approach, the system 200 may be configured to permit the mobile robot 210 to locate, retrieve, and transport any one selected tape reel 202 to the tape drive 204, and to initialize reading of the tape by the tape drive 204 within about five seconds of receiving a request to read data from the tape of the selected tape reel 202, more preferably within about 2 seconds, and ideally less than about 1 second.

In several embodiments, several mobile robots 210 move unconstrained along the surface, e.g., two, five, or more. In other embodiments, only a single robot may be present on a given level. It may be advantageous for the robots 210 to be unconnected by cables to any other part of the system 200. This design favors fast robot motion, and facilitates the robots 210 being capable of moving between levels, rooms, enclosures, etc. Also, when multiple robots 210 are used, any problem with cables getting tangled together from different robots 210 is eliminated when the robots 210 are controlled wirelessly.

The mobile robots 210 may have predetermined "resting" locations, as shown by mobile robots 210, according to one embodiment. As shown in FIG. 2, mobile robot 211 has moved from a resting location, acquired tape reels, and is moving toward a tape drive to load the tape reels in the tape drive for reading tape therefrom. Also, mobile robot 208 has retrieved tape reels from a tape drive which has completed a reading operation, and is returning the tape reels to their storage location. Of course, this movement is exemplary only, and not meant to be limiting on the invention in any way.

The mobile robots 210 may move in straight line increments, or may move more naturally in arcing patterns between positions on the surface, according to various embodiments. Also, the mobile robots 210 may avoid objects in their path according to any method as would be understood by one of skill in the art upon reading the present descriptions.

In some previous tape library geometries, a library gripper accesses an array of tape reels and/or tape cartridges, through motion of a first carriage along a rail or pair of rails. The first carriage in turn holds another set of rails or guides which enables motion of a second carriage holding the gripper. The scheme enables the gripper to access anywhere in two dimensions, where the tape reels or tape cartridges are located. Alternately, in some previous designs, the second carriage has been replaced by a rotary motion which operates about the axes of the first carriage. This scheme limits the flexibility of the library, because grippers (or robots) may interfere with one another. For example, if the grippers use the same set of rails, then they cannot move past each other. Also, there is generally no available space in tape libraries for the installation of an additional set of rails, so this scheme is severely limited in its functionality. In addition, these previous designs do not facilitate easy recovery of access to the tape reels and/or tape cartridges when a gripper fails.

On the other hand, the systems herein use "unconstrained" robots, which facilitate access to the tape reels and/or tape cartridges. Here, the term "unconstrained" indicates that movement is not constrained to rails, tracks, guideways, pathways, etc., but instead movement is free in at least two dimensions, e.g., along a surface. Thus, unconstrained mobile robots are easily added or removed from the surface, and they can easily maneuver around each other along the surface, since they are not fixed to a rail or track.

As shown in FIG. 3, according to one embodiment, the surface across which the mobile robots 210 travel unconstrained may be an upper surface 302 (such as a ceiling in one approach) and may be unpatterned so that the mobile robots 210 are unconstrained, e.g., not limited to motion on particular tracks, paths, rails, etc. Thus each mobile robot 210 is capable of movement independent of movement of any other mobile robot 210, e.g., each mobile robot 210 may cross the path that any other mobile robot 210 has taken or will take. Similarly, by attaching the mobile robot 210 to a surface 302 separate from a surface 304 supporting the tape reels 202, the mobile robots 210 are not constrained to follow aisles, paths, corridors, etc., between groups, columns, rows, etc., of tape reels 202. In one example, this movement may be analogous to the movement of a shopping cart through a supermarket. However, instead of being constrained to moving between the shelves of the supermarket, the mobile robots 210 are capable of moving unconstrained along the ceiling of the supermarket, capable of selecting any desired item from below in the shelves, as an example. The ability to use multiple mobile robots 210 to access a group of tape reels 202 provides faster access of short, popular files. This geometry is much more flexible than previous configurations, in which the tape cartridge grippers were supported on x and y positioners which could not cross paths. The mobile robots 210 may be coupled to the upper surface 302 using magnets 310 or some other coupling or attraction device that biases the mobile robots 210 towards the upper surface 302. By allowing the mobile robots 210 to maneuver on the upper surface 302, the tape reels 202 may simply rest on a lower surface 304, such as a floor. The magnets 310 may bias the mobile robot 210 toward the upper surface 302 with much more force than gravity biases the mobile robot 210 toward the lower surface 304, allowing a much higher frictional force of the mobile robot wheels 306, 308, thereby enabling faster robot acceleration and thus faster seek times.

In one approach, the mobile robot 210 may have three wheels 306, 308: two rear wheels 308 and one front (maneuvering) wheel or ball 306. In another three-wheel configuration, the mobile robot 210 may have two front wheels 308, and a rear (maneuvering) wheel or ball 306. For sake of clarity, a maneuvering wheel in this discussion indicates a wheel whose direction of positioning or rotation with respect to the robot body is not fixed. Of course, the mobile robot 210 may have any number of wheels 306, 308 or other apparatus for causing movement of the mobile robot 210 as would be known to one of skill in the art. Steering of the robot may be accomplished in any known manner, such as by independently driving two of the wheels with a caster maneuvering wheel, steering using the maneuvering wheel, and driving and steering with the maneuvering wheel, etc.

The mobile robot 210 may have a reel gripper 312, which when the mobile robot 210 is positioned above a desired tape reel 202 or set of tape reels 202, may grab, attract (for example, magnetically), secure, or otherwise take hold of the tape reel 202 such that it may be loaded into the mobile robot 210 and transported to a tape drive or back from a tape drive to the tape reel's storage location.

With continued reference to FIG. 3, in some embodiments, the mobile robot 210 may have a height such that it may be able to maneuver above the tape reels 202 in a space H of about 1.75", which measures about 1 U in a standard rack configuration. The smallest units used for rack-mounted computer components are "1 U" units, which are 1.75" high. Since a reel for standard 0.5" wide magnetic tape may be as thin as 0.58", this 1 U unit may be thick enough to hold a single layer of storage having a layer of tape reels 202 plus mobile robots 210. Thus a single layer design having mobile robots 210, tapes 202, and drives may be used for various tape library configurations, ranging from a single layer to multiple stacked layers, which may fill an entire storage room, or any size desired.

In one approach, the plurality of tape reels 202 may be spaced from and located within a distance of about 15 cm from the upper surface, e.g., 15±1.5 cm, less than about 20 cm, less than about 10 cm, less than about 5 cm, or any value in the foregoing ranges.

The system 200 may also comprise a controller 212 for directing movement of the robot 210. The controller 212 may be on board the robot 210, or away from the robot 210 (as shown in FIG. 2) and in communication therewith via any type of communication channel (such as wireless, wired, infrared, etc.).

According to one illustrative embodiment, a system 200 comprises at least one tape drive 204 configured for reading data from tape stored on one of a plurality of tape reels 202, at least one mobile robot 210 having a volume of less than about 1000 cubic inches (and in some approaches less than about 900 in$^3$, less than about 750 in$^3$, less than about 500 in$^3$, less than about 250 in$^3$, less than about 100 in$^3$, less than about 50 in$^3$) configured for selectively retrieving one or more of the plurality of tape reels 202 and transporting the one or more retrieved tape reels 202 to the tape drive 204. The mobile robot 210 moves along a surface, and is preferably not mechanically constrained to move along a pre-determined trackway or path (i.e., it is unconstrained). In some approaches, the robot 210 may be mechanically unconstrained and may be able to move autonomously across the surface via any desired path.

To assist in navigation of the mobile robot 210, at least one of the lower and upper surfaces may include an optical pattern usable for navigation of the mobile robot 210, and the mobile robot 210 may be configured for recognizing the optical pattern.

Figure 4A:
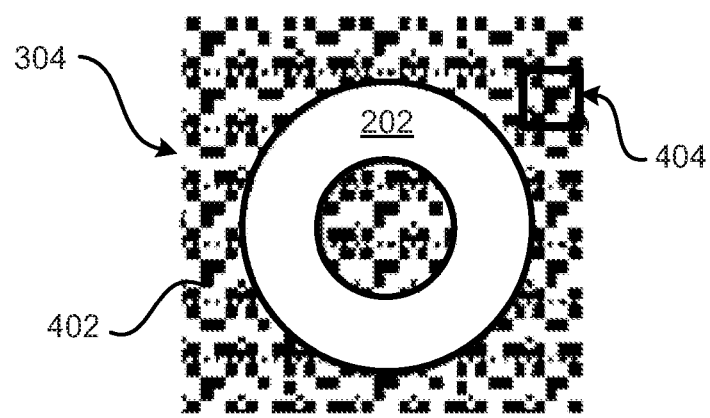
FIG. 4A illustrates an optical pattern on a surface, according to one embodiment.

As shown in FIG. 4A, the lower surface or floor 304, for example, may include an optical pattern 402 designed for the mobile robot to locate its position. This optical pattern 402 may be a rectangular grid extending over the entire floor 304, with each grid square 404 labeled with readable code identifying the row and column of the particular grid square 404. This readable code may take any form as would be understood by one of skill in the art.

Figure 4B:
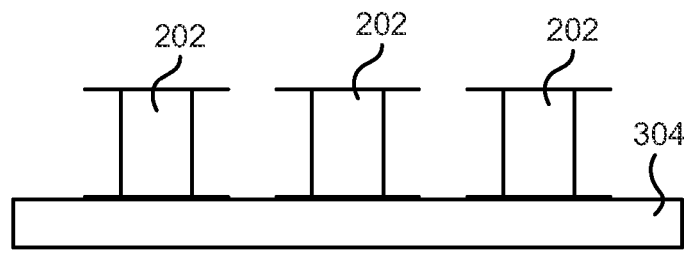
FIG. 4B illustrates a surface design, according to one embodiment.
Figure 4C:
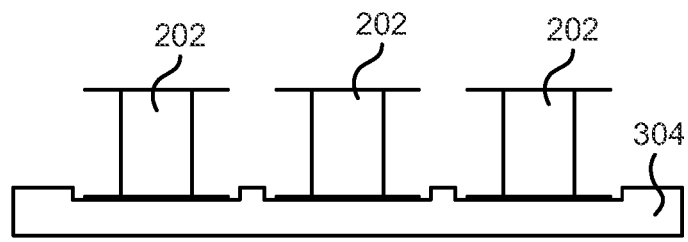
FIG. 4C illustrates a surface design, according to one embodiment.
Figure 4D:
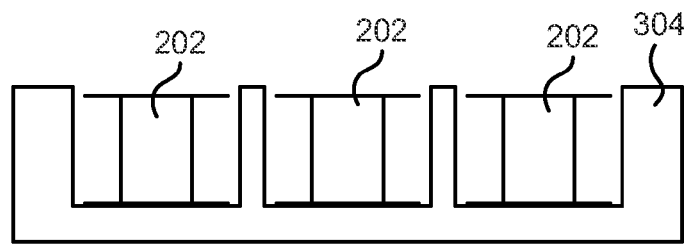
FIG. 4D illustrates a surface design, according to one embodiment.

The floor 304 may be planar, as shown in FIG. 4B, covered with small indentations as shown in FIG. 4C, or have a lattice defining receptacle areas in which the tape reels 202 are positioned as shown in FIG. 4D, according to various embodiments. By extending the lattice up past the tape reels 202, it may form a surface on which the mobile robot 210 may be supported, and the mobile robots 210 would not maneuver along the upper surface but instead would maneuver on the lower surface formed by the top surface of the lattice, according to one embodiment.

Figure 5A:
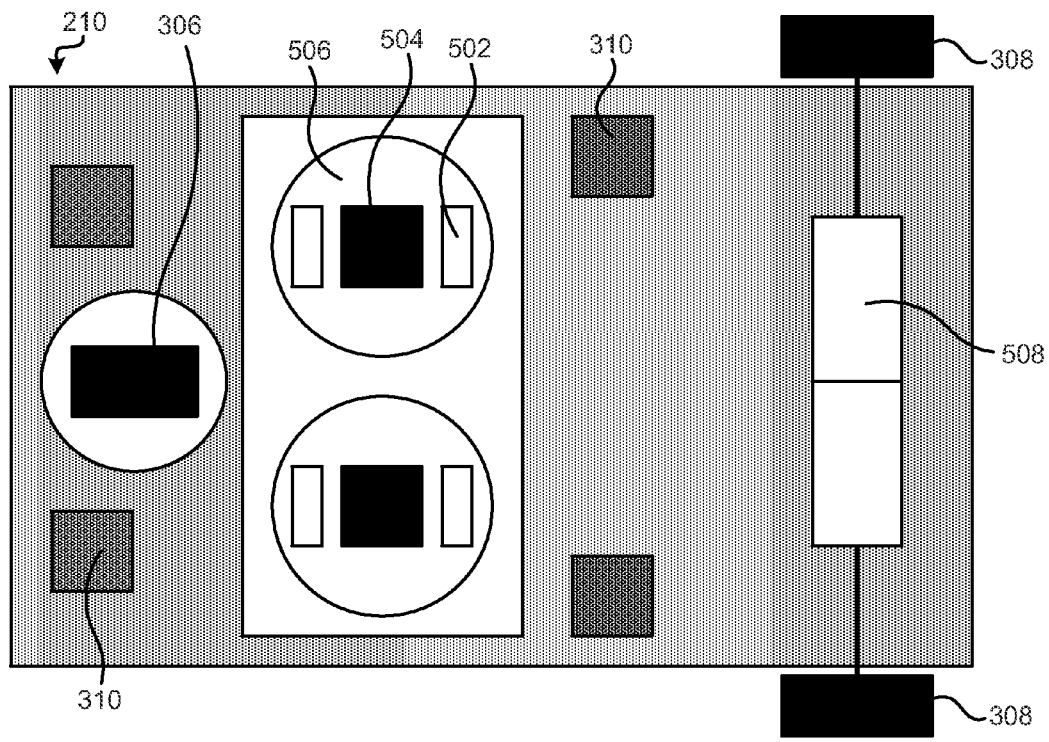
FIGS. 5A-5B show detailed views of a mobile robot, according to one embodiment.
Figure 5B:
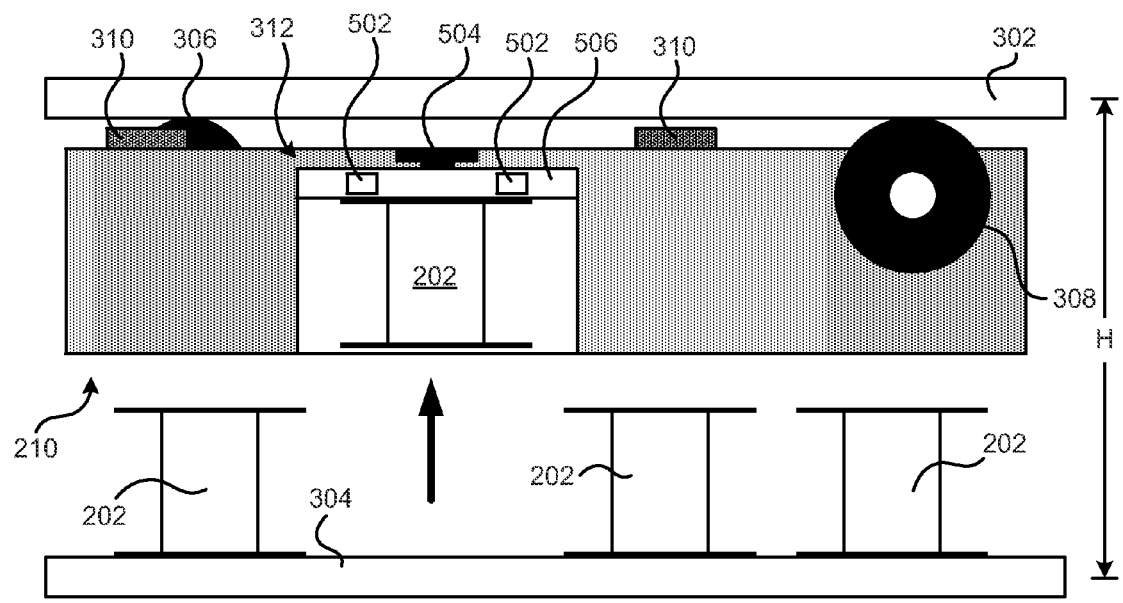

The design of the mobile robot 210 may include additional features, abilities, etc., as would be understood by one of skill in the art upon reading the present descriptions. In one embodiment, a mobile robot 210 is shown in FIGS. 5A-5B, according to one approach. In this example, one or more motors 508 power symmetric drives wheels 308 that allow forward and backward motion, and in a further approach, the drive wheels 308 may provide steering if the drive wheels 308 are operated independently using two symmetric drive motors 508. These motors 508 may be attached to each wheel 308 by a single step-down gear. The mobile robot 210 may additionally be supported by one or more other omni-directional passive wheels 306, which may move in any direction, and may be maneuverable (e.g., steerable, positionable, etc.), in some approaches. The omni-directional wheel(s) 306 may be caster wheels, and more preferably may be spherical balls which are also referred to as ball transfers.

To pick up the tape reel(s) 202, a simple platform 312 may be lowered and raised by a solenoid or motor (not shown). If the tape reels 202 are topped by a magnetic plate, the tape reels 202 may be gripped to the platform 312 by energizing electromagnets 502. One or more cameras 504 may allow for navigation of the mobile robot 210. A camera 504 may be placed above each reel holding position 506, enabling the mobile robot 210 to determine its position and to deliver a tape reel 202 directly into a tape drive. The mobile robot 210 need not be made precisely, because the cameras 504 may simultaneously image the tape reels 202 and location grid (or the tape reel chucks on the drive) to precisely position the tape reels 202, in some approaches.

To enable multiple mobile robots 210 to work in the same work space, such as the same floor, there are preferably no cables attached to the mobile robots 210. The mobile robot 210 uses little power, and a peak speed of about 2 m/s in some embodiments is sufficient to pick up the tape reel 202 and bring it to the drive within a half second. For a 150 gram mobile robot 210, the corresponding kinetic energy would be about 0.3 Joule. This amount of energy may be supplied by a rechargeable battery, through inductive coupling, etc., but a capacitor, with its extremely long lifetime, may be preferable. In one embodiment, an 80 volt, 1000 µF electrolytic capacitor which includes 3.2 Joules, yet is only 16 mm diameter by 40 mm long may be used. The mobile robot 210 may be recharged at its parking position, or at the tape drive when it loads the tape reel 202.

As shown in FIG. 5B, according to a preferred embodiment, the tape reels 202 are positioned on a floor 304, the surface 302 is opposite the floor 304, and the mobile robot 210 is biased toward the surface 302, such as through magnetic biasing (by using magnets 310), thereby suspending the robot 210 above the tape reels 202. For example, the mobile robot 210 may be magnetically biased toward the upper surface 302.

Figure 6A:
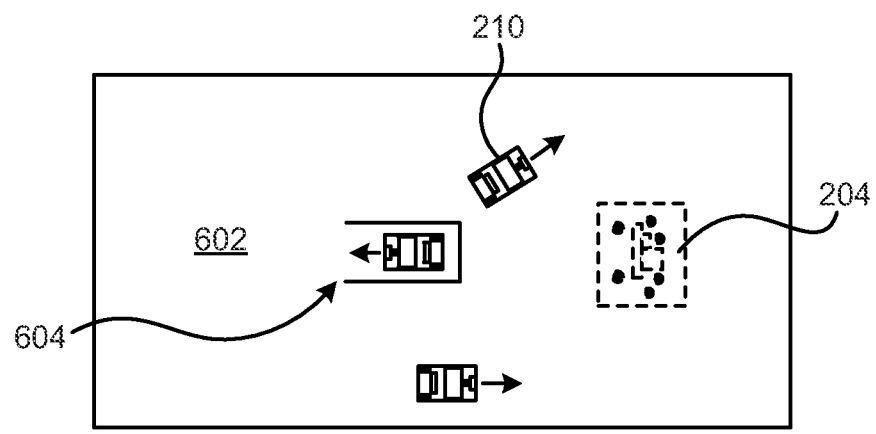
FIGS. 6A-6B show detailed views of a tape library using mobile robots, according to one embodiment.
Figure 6B:
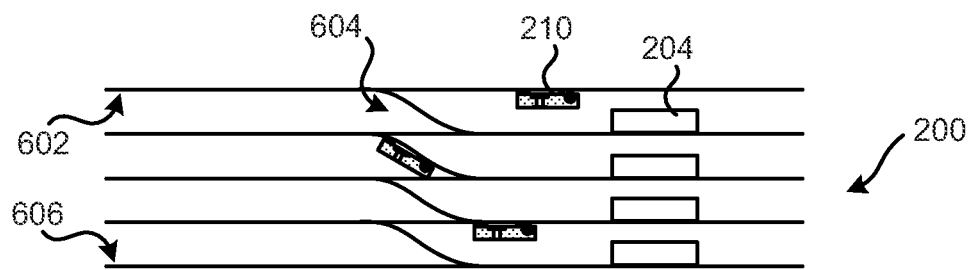

As shown in FIGS. 6A-6B, a library controller may communicate with the mobile robots 210 by light, such as infrared (IR); radio frequency (RF); etc., and may be differentiated on each level of the library 200 to avoid cross-talk. The library controller computes a path the mobile robot 210 is to take to pick up and drop off the tape reels and load the tape reels in the tape drives 204. The mobile robot 210 may servo along the path by using its cameras, in one approach, or it may use encoders on its motors or wheels to servo, using the cameras only for fine adjustments, in another embodiment.

In one embodiment, the tape library 200 may comprise a plurality of tape drives 204, where each tape drive 204 is positioned on the floor supporting the tape reels, the floor being below the surface on which the mobile robots 210 maneuver by a distance sufficient to allow movement of the mobile robots 210 therebetween (between the tape reels and the surface).

In large multilayer libraries 200, mobile robots 210 may move between floors using ramps 604. This enables the mobile robots 210 themselves to load different floors with tape reels, and to rebalance the work load by optimally locating the mobile robots 210 and organizing the tape reels. The relative number of mobile robots 210, tape reels, and tape drives 204 may be determined by the access frequency of the files, data, etc.

According to one approach, multiple surfaces having a spaced and stacked configuration may be used, and the mobile robot 210 is configured to travel between the multiple surfaces. In this approach, at least one ramp 604 may be provided, connecting at least two of the multiple surfaces, thereby permitting the mobile robot 210 to travel between the multiple surfaces. In these or any other approaches, there may be no cable coupled between the mobile robot 210 and any other component of the system.

As illustrated in FIG. 6B, according to one embodiment, one or more tape drives 204 may be secured directly to the floors 606 of a tape library 200 having one or more levels. In addition, the mobile robots 210 may be attracted to the ceilings 602. In this design, the drive(s) 204 may be easily positioned at any location in the tape library 200 by simply leaving space in the array of reels (not shown). This arrangement facilitates reconfiguration of the tape library 200 after it has been manufactured, along with replacement of failed tape drives should they occur. For example, the mobile robots 210 may be adapted for moving and/or relocating a tape drive 204. At least one tape drive 204 may be positioned on each level of the tape library 200, according to one embodiment.

The library can be configured to have "spare" tape drives 204 and mobile robots 210 ready to be put into use upon failure of other tape drives and mobile robots, according to one embodiment. In another embodiment, when extra tape drives 204 or mobile robots 210 are to be used, due to some factor, such as an increased work load, failed mobile robots and/or tape drives, etc., the tape library 200 may allow adding or removing tape drives, tape reels, and/or mobile robots by the user after manufacture of the tape library 200.

Any type of tape threading system known in the art may be adapted for use with the systems described herein, according to various embodiments. For example, if tape reels are used individually (not as pairs), a standard threader mechanism may be used to thread the tape reel onto the tape drive, according to one embodiment. Storing the tape on pairs of reels has an advantage in that after loading, the tape is ready to be used and does not need to be wound onto another inboard reel. Also, when the tape is finished being used, both reels may be removed with the tape, and the tape does not need to be unwound from the inboard reel in order to be removed.

Figure 7A:
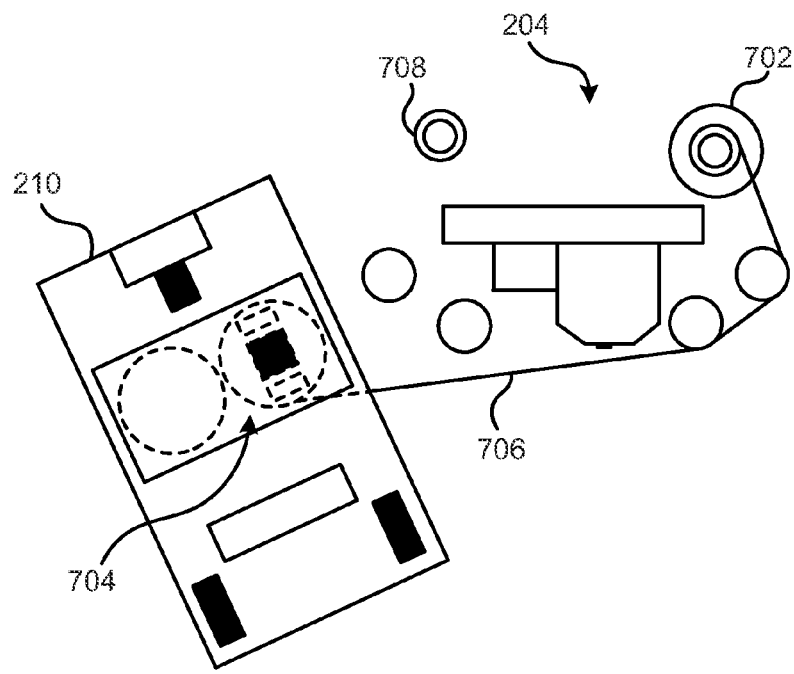
FIGS. 7A-7D illustrate tape threading using a mobile robot, according to one embodiment.

In another embodiment, as shown in FIG. 7A, the tape drive 204 itself may have no threader. Rather, the mobile robot 210 may be configured to thread tape 706 of the retrieved tape reel 702 onto the tape drive 204. In one approach, a mobile robot 210 loads the tape 706 provided on a pair of tape reels 704, 704, by first dropping off one reel 702 on the drive 204, and then the other reel 704 on a reel chuck 708, for which a reel motor may wind the tape 706. Alternately, if the tape 706 is stored on one reel only (such as reel 702), the mobile robot 210 may move an end of the tape not on the reel 702 to secure it to the inboard drive wheel, as described in relation to FIGS. 7B-7D. The precision of the mobile robot 210 motion may be much greater than that of a leader pin loader mechanism currently used in tape drives, in some approaches.

Figure 7B:
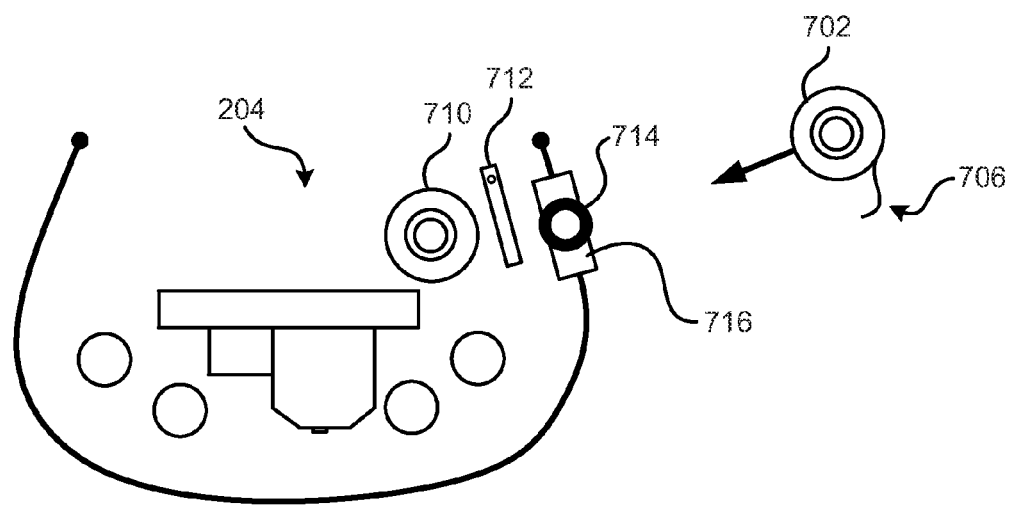
Figure 7C:
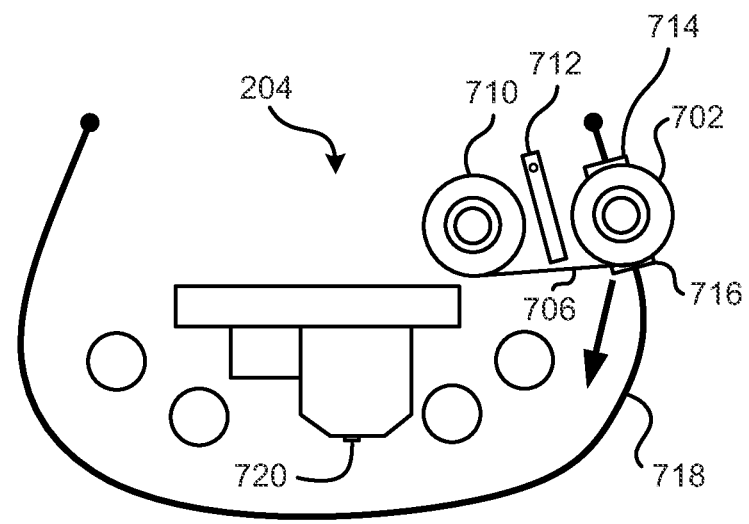
Figure 7D:
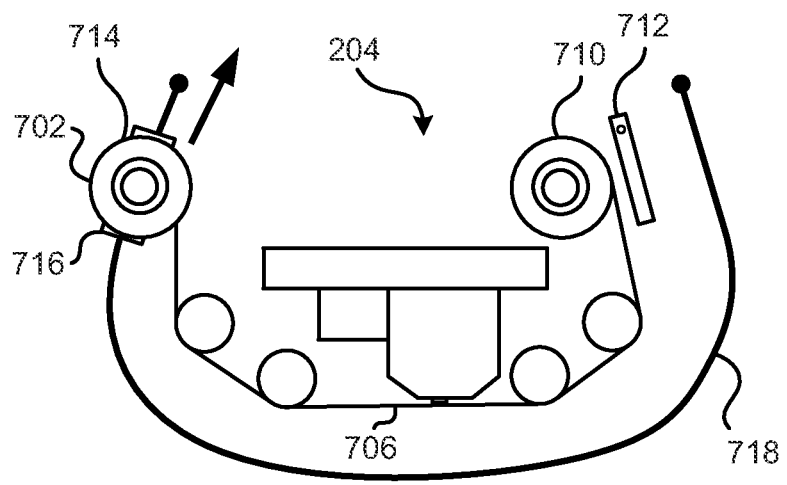

In another embodiment, as shown in FIGS. 7B-7D, a single reel 702 of tape 706 may be loaded onto a reel chuck and motor 714 which are fixed to a carriage 716 that is adapted to follow a guide 718 that allows for motion of the chuck 714 around the tape drive 204 to facilitate threading of the tape 706. Before loading the reel 702 on the chuck 714, the chuck 714 is brought into proximity of the inboard (take-up) reel 710, as shown in FIG. 7B. After the mobile robot (not shown for clarity) places the reel 702 on the chuck 714, a mechanism 712 attaches the end of the tape 706 to the take-up reel 710. See FIG. 7C. At this point, the tape 706 may be transferred between reels 702 and 710 as part of a preliminary locate operation, before the tape 706 contacts the recording head 720 or any guide surfaces, such as rollers, thus enabling faster tape locate with reduced tape damage and drive wear. Then, the chuck and reel motor 714 and tape reel 702 are moved along the guide 718 to a final position, as shown in FIG. 7D, where the tape 706 may be read from or written to.

In another embodiment, rather than moving the library reel 702 and carriage 716, the take-up reel 710 and its motor may be moved to thread the drive 204. In yet another embodiment, if the tape 706 is stored on a pair of reels, the mobile robot may position the two reels directly on the tape drive 204, where the tape 706 may be located before threading.

Figure 8A:
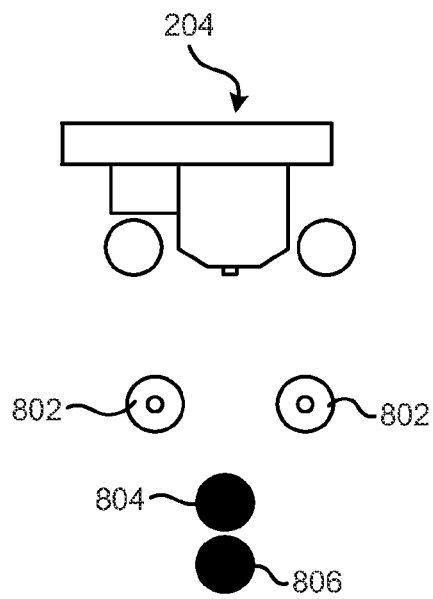
FIGS. 8A-8D show steps of self tape threading using a tape drive, according to one embodiment.
Figure 8B:
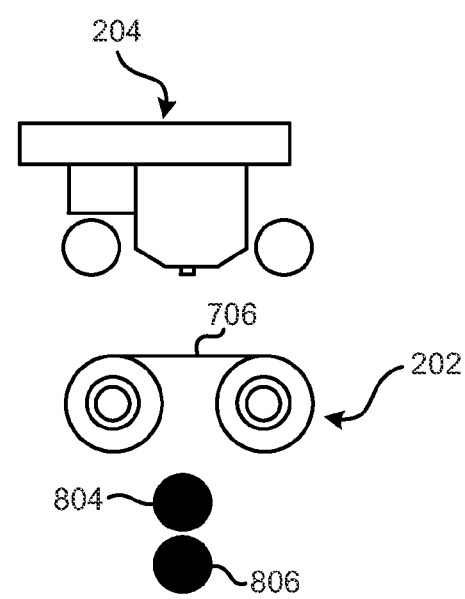
Figure 8C:
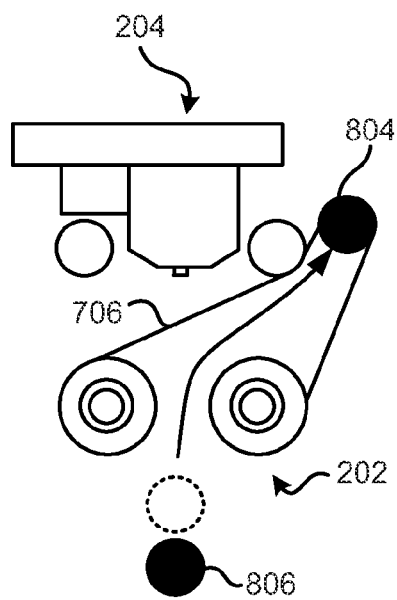
Figure 8D:
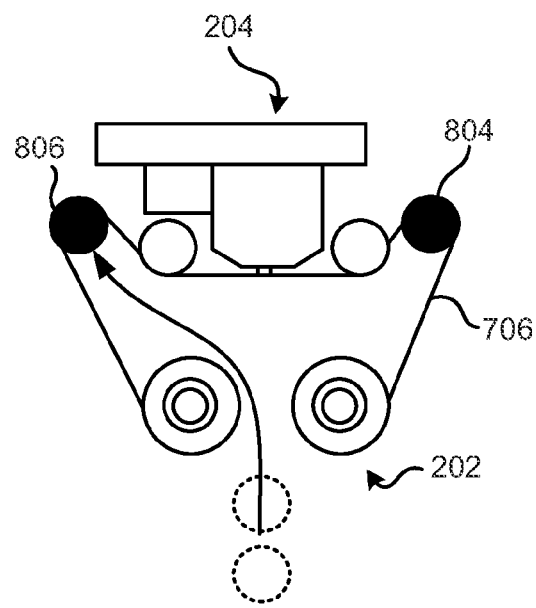

Alternatively, as shown in FIGS. 8A-8D, the tape 706 may be held on two tape reels 202, and a method may be used which avoids the unreliability of a leader pin. In this approach, the reel drive chucks 802 may be spaced with the same close spacing of the tape reels 202 in their storage position. The mobile robot places the tape reels 202 on the chucks 802, as shown in FIG. 8B, and two moveable rollers 804, 806 sequentially thread the tape 706 in position. First, roller 804 threads the tape 706, as shown in FIG. 8C, and then roller 806 threads the tape 706, as shown in FIG. 8D. The tape 706 may locate before the rollers 804, 806 move into their final position, thus avoiding the extra wear and control difficulties associated with contact of the tape 706 with the roller 806 or other guide surfaces and the head. Alternately, two smooth cylinders which form air bearings may be used to thread the tape drive, in another embodiment.

In one embodiment, each reel may be large enough (e.g., the flanges are big enough) to hold the entire length of tape, if all the tape is to be accessed. If the tape is stored in pairs of these large reels, the capacity of the library may be reduced by a factor of two from what it may be by using single reels.

Figure 9A:
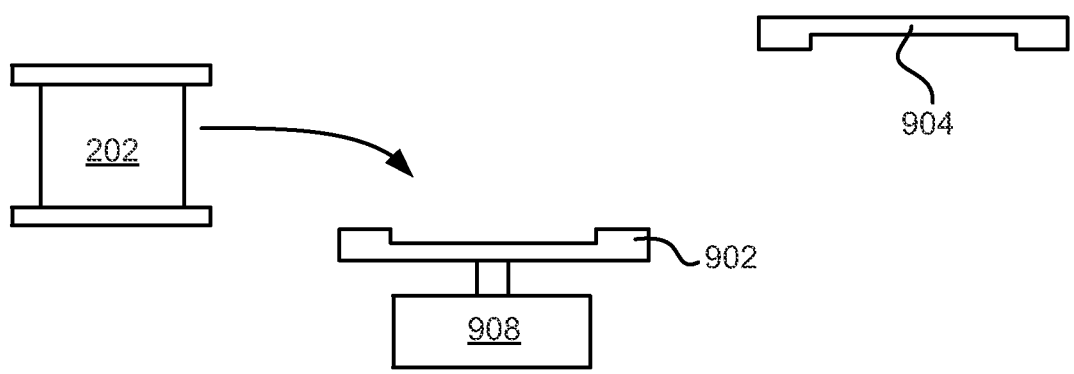
FIGS. 9A-9C show steps of using flange extenders, according to one embodiment.
Figure 9B:
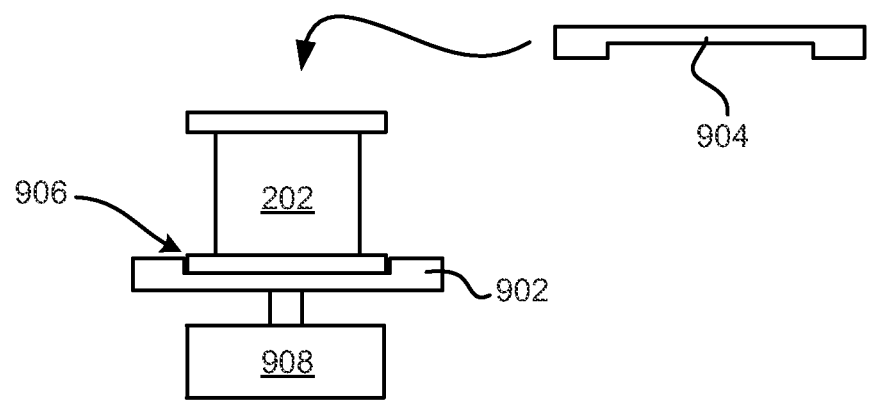
Figure 9C:
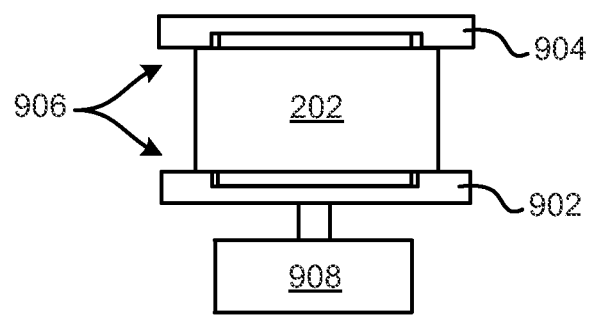

In another approach, the tape may be stored on a pair of reels, where at least one reel is not large enough to accept the entire length of tape. As shown in FIGS. 9A-9C, a reel-size reduction may be effected by incorporating temporary flange extenders 902, 904 in the tape drive. In the tape drive, a temporary flange extender 902 is fixed to the motor/reel chuck 908 so that the reel flange 906 is extended when it is on the drive. Once the reels 202 are in the drive, another flange extender 904 is placed on the top of each of the reels 202, so that tape can be spooled onto one of the reels. Before the tape reels 202 are unloaded from the tape drive, the tape is spooled back evenly between the tape reels 202, so that it lies only between the permanent flanges 906 on the tape reels 202.

In another approach, a packing roller may be used to keep the tape on the reel after its diameter becomes bigger than the flange.

In some approaches, the tape library may be fault tolerant and/or self repairing. For example, each tape cartridge may be read by a number of different drives, if a robot fails then other robots may maneuver around the failed robot, a failed robot may be towed away by another robot and replaced, and/or a failed tape drive may be towed away and replaced.

According to one embodiment, if a mobile robot fails, it may be towed away and replaced by another mobile robot. The tape drives may be configured so that a mobile robot may easily tow away and replace a tape drive, after temporarily clearing away the tape reels that may be in the path taken to remove the tape drive. The power and data connections may be made to use very little force, for example, using simple sliding spring contacts for the power and optical link for the tape drive data transfer.

According to one embodiment, the system may be configured to allow removal of a failed mobile robot using another mobile robot, in which case the failed mobile robot may then be replaced with the mobile robot performing the removing or another mobile robot, in some approaches.

In another embodiment, the mobile robot may be configured to remove the tape drive, e.g., if the tape drive is broken. Likewise, the robot may install a replacement or repaired tape drive.

It will be clear that the various features of the methodologies and embodiments described herein may be combined in any way, creating a plurality of combinations from the descriptions presented herein.

Communications components such as input/output or I/O devices (including but not limited to keyboards, displays, pointing devices, etc.) may be coupled to the system either directly or through intervening I/O controllers.

Communications components such as buses, interfaces, network adapters, etc., may also be coupled to the system to enable the data processing system, e.g., host, to become coupled to other data processing systems, remote printers, storage devices, etc., through intervening private or public networks. Modems, cable modems, and Ethernet cards are just a few of the currently available types of network adapters that maybe used, in some approaches.

It will be further appreciated that embodiments described herein may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
   causing, using a controller, a mobile robot having a volume of less than about 1000 cubic inches to selectively retrieve at least one of a plurality of tape reels; and
   causing the mobile robot to transport the retrieved tape reel to a tape drive that is configured for reading data from tape stored on at least one of the plurality of tape reels,
   wherein the retrieved tape reel is a single reel of tape, wherein the mobile robot threads the tape on the retrieved reel tape reel onto the tape drive by moving an end of the tape not on the reel to an inboard drive wheel.

2. A method as recited in claim 1, wherein the mobile robot moves unconstrained along a first surface.

3. A method as recited in claim 1, wherein the tape reels are positioned on a second surface, wherein a first surface is opposite the second surface, the mobile robot being biased toward the first surface.

4. A method as recited in claim 1, wherein each tape reel has a length of tape thereon of less than about 50 meters.

5. A method, comprising:
   causing, using a controller, a mobile robot to selectively retrieve at least one of a plurality of tape reels;
   causing the mobile robot to transport the at least one retrieved tape reel to a reel chuck; and
   threading a tape on the at least one retrieved tape reel across a tape drive by moving at least one of the tape reel and a take up reel coupled to the tape.

6. A method as recited in claim 5, wherein the mobile robot has a volume of less than about 1000 cubic inches.

7. A method as recited in claim 5, wherein the mobile robot moves unconstrained along a first surface.

8. A method as recited in claim 5, further comprising performing a preliminary locate operation by transferring the tape between the reels before the tape contacts a recording head and/or a guide surface of the tape drive.

9. A method as recited in claim 5, wherein the tape reel is moved along a guide to thread the tape onto the tape drive.

10. A method as recited in claim 5, wherein the take up reel is moved along a guide to thread the tape onto the tape drive.

11. A method as recited in claim 5, wherein the tape is stored on the tape reel and take up reel, wherein the mobile robot retrieves the reels and positions the reels on the tape drive.

12. A method as recited in claim 5, wherein the tape reels are positioned on a second surface, wherein a first surface is opposite the second surface, the mobile robot being biased toward the first surface.

13. A method as recited in claim 11, further comprising performing a preliminary locate operation by transferring the tape between the reels before the tape contacts a recording head and/or a guide surface of the tape drive.

14. A method, comprising:
    causing, using a controller, a mobile robot to selectively retrieve a pair of tape reels coupled to a tape;
    causing the mobile robot to transport the tape reels to a pair of reel chucks; and
    threading the tape across a tape drive using at least one of rollers and cylinders.

15. A method as recited in claim 14, further comprising performing a preliminary locate operation by transferring the tape between the reels before the tape contacts a recording head and/or a guide surface of the tape drive.

16. A method as recited in claim 14, wherein the mobile robot has a volume of less than about 1000 cubic inches.

17. A method as recited in claim 14, wherein the mobile robot moves unconstrained along a first surface.

18. A method as recited in claim 14, wherein the tape reels are positioned on a second surface, wherein a first surface is opposite the second surface, the mobile robot being biased toward the first surface.

* * * * *